United States Patent [19]

Fowler

[11] 4,103,638
[45] Aug. 1, 1978

[54] AUTOMATIC PILOTING SYSTEM

[75] Inventor: John T. Fowler, Winthrop, Mass.

[73] Assignee: The Laitram Corporation, Harahan, La.

[21] Appl. No.: 787,271

[22] Filed: Apr. 13, 1977

Related U.S. Application Data

[62] Division of Ser. No. 630,539, Nov. 10, 1975, Pat. No. 4,038,528.

[51] Int. Cl.² .......................................... B63H 25/36
[52] U.S. Cl. ................ 114/144 E; 116/126; 324/61 R; 340/30; 73/178 R
[58] Field of Search ............... 114/144 E; 235/150.2; 73/178 R; 116/126; 340/27 R, 27 AT, 30, 200, 282; 324/61 R; 328/1; 307/308; 33/1 N

[56] References Cited

U.S. PATENT DOCUMENTS

| | | | |
|---|---|---|---|
| 3,280,781 | 10/1966 | Koerner | 114/144 E |
| 3,924,177 | 12/1975 | Lemineur | 324/61 R |
| 4,040,041 | 8/1977 | Fletcher | 340/200 |

*Primary Examiner*—Stephen G. Kunin
*Assistant Examiner*—Reinhard J. Eisenzopf
*Attorney, Agent, or Firm*—Weingarten, Maxham & Schurgin

[57] ABSTRACT

An automatic piloting system for the automatic steering of a marine or other vessel along an intended course in which a digital signal representing an intended course is processed to provide rudder commands for steering the desired course.

6 Claims, 4 Drawing Figures

AUTOMATIC PILOTING SYSTEM

This is a division of application Ser. No. 630,539, filed Nov. 10, 1975, now U.S. Pat. No. 4,038,528.

FIELD OF THE INVENTION

This invention relates to automatic piloting systems and more particularly to an electronic system for the steering of a marine or other vessel along an intended course.

BACKGROUND OF THE INVENTION

In most automatic piloting systems known in the art, a course transmitter is employed to provide a signal indication of an intended course to be steered and to provide steering command signals for rudder control to maintain an intended course. A feedback signal representing rudder position is provided by a rudder angle sensor, this feedback signal being applied to the course transmitter which will be rotated or otherwise adjusted to seek a null condition. Although such systems perform adequately for many purposes, their implementation is usually quite complex, requiring analog servomechanical apparatus including a specialized course transmitter for indicating an intended course and for generating steering commands. Moreover, being null type servo systems, known automatic piloting systems are most sensitive at the null point and are of reduced accuracy for increasing course error.

SUMMARY OF THE INVENTION

In brief, the present invention provides a relatively simple automatic piloting system in which an intended course is denoted by a digital signal and processing accomplished by relatively simple electronics without need for complex servo-mechanisms. In preferred implementation, a remote reading digital magnetic compass is employed which provides digital signals representative of compass heading. With a vessel being steered along a desired course, these digital signals provide an input to the novel automatic piloting system, the course being maintained by relatively simple electronic circuitry. The system of the present invention requires no specialized course transmitter to introduce a signal representing desired heading, but rather can be employed with any input source which provides a digital number representing the intended course, such as a digital magnetic compass. The novel system exhibits wide dynamic range and provides high accuracy control over the entire range of course errors encountered.

DESCRIPTION OF THE DRAWINGS

The invention will be more fully understood from the following detailed description taken in conjunction with the accompanying drawings in which.

DETAILED DESCRIPTION OF THE INVENTION

Figure 1:
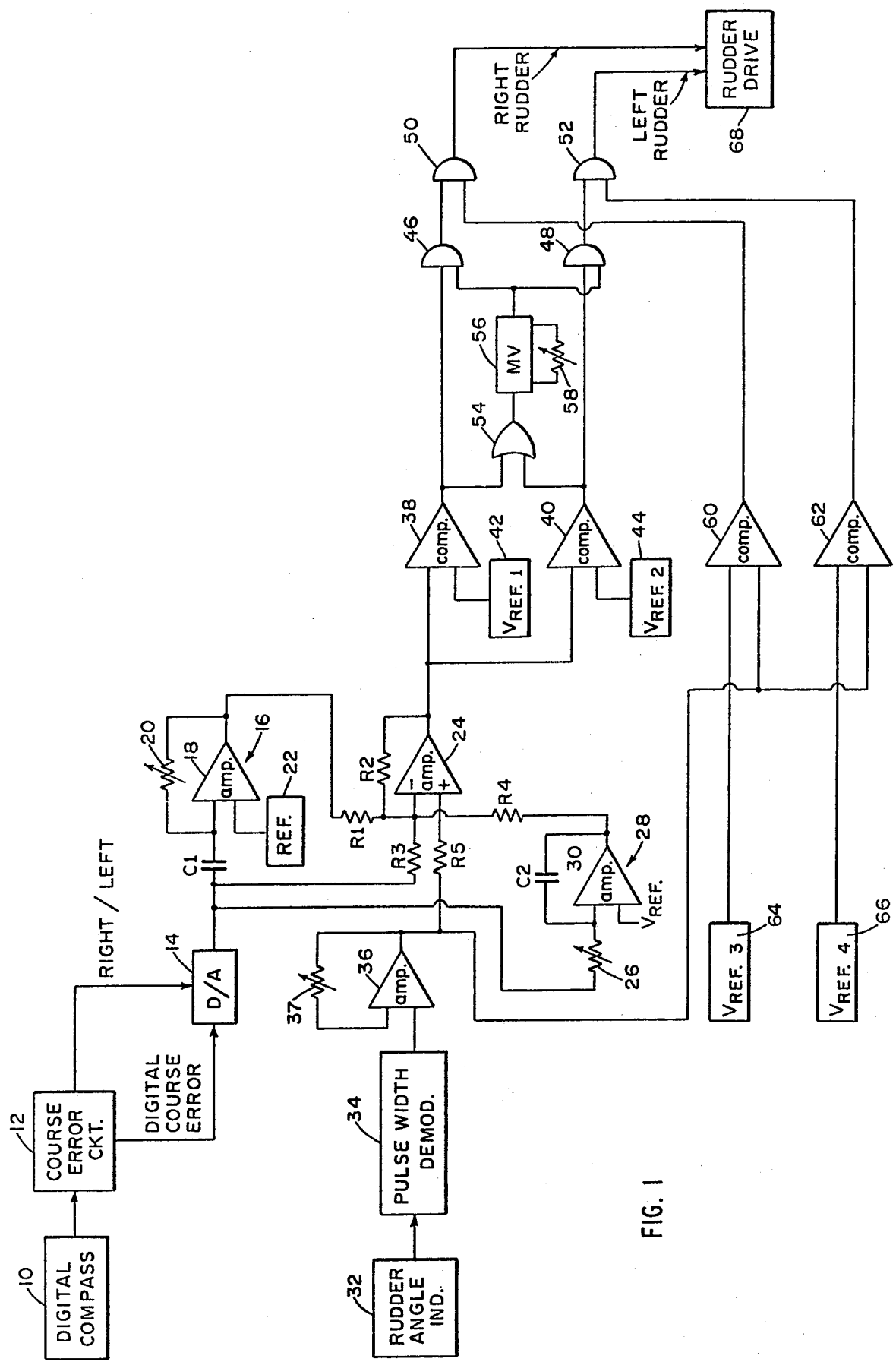
FIG. 1 is a diagrammatic representation of an automatic piloting system according to the invention.

Referring to FIG. 1, there is shown a digital magnetic compass 10 providing digital output signals representative of compass heading which are applied to a course error circuit 12 which, in turn, provides a digital signal representative of the magnitude of course error and a digital signal indication of whether the error is to the right or left of intended course. The digital compass is the subject of U.S. Pat. No. 3,833,901 assigned to the assignee of this invention. This compass provides serial output pulses of a number representative of compass heading as derived from an electro-optically sensed compass card. The intended course to be maintained is provided in the course error circuit 12 typically by entering the reading from digital compass 10 when the vessel is on an intended course. The signals from circuit 12 are applied to a digital-to-analog converter 14 which provides an analog output voltage representative of the magnitude and sense of course error. This signal is coupled via a capacitor C1 to a differentiator 16 which is typically implemented by an operational amplifier 18 having an adjustable resistor 20 in feedback connection between the output and an input thereof. The other input of operational amplifier 18 is coupled to a reference voltage source 22. The output of differentiator 16 is coupled via a resistor R1 to the negative input of a summing amplifier 24 which includes a feedback resistor R2 therearound. The output signal from converter 14 is also applied to the negative input of amplifier 24 by means of a resistor R3. The output voltage from converter 14 is also applied via a gain control 26 to an integrator 28 composed of an operational amplifier 30 having a capacitor C2 in feedback connection therewith. The second input to amplifier 30 is coupled to a reference voltage ($V_{ref}$), such as from source 22. The output signal from integrator 28 is coupled by way of a resistor R4 to the negative input of amplifier 24.

A rudder angle indicator 32 provides a pulse width modulated signal representative of measured rudder angle to a pulse width demodulator 34 which provides an analog output signal representative of angular rudder position, and which signal is applied via a buffer amplifier 36 and a resistor R5 to the positive input of amplifier 24. A gain control 37 is provided in feedback connection around amplifier 36. The output of amplifier 24 is applied to an input of respective comparators 38 and 40. The comparators 38 and 40 are connected to respective reference sources 42 and 44 which provide respective reference signals $V_{ref1}$ and $V_{ref2}$ to the corresponding comparators. One of the reference sources provides a relatively positive threshold level with respect to a zero course error reference value, while the other reference source provides a relatively negative reference level with respect to this reference value. The reference sources 42 and 44 provide bipolar threshold levels defining a range within which no error correction is performed, and these reference sources are adjustable to control the error range within which no rudder control is provided. Such adjustment serves as a weather control, the adjustable range usually being selected in accordance with sea and weather conditions.

The output signals from comparators 38 and 40 are applied to respective AND gates 46 and 48, the respective outputs of which are applied to respective AND gates 50 and 52. The output signal from comparators 38 and 40 are also applied via an OR gate 54 to a multivibrator circuit 56, the output of which is applied to the second inputs of gates 46 and 48. The multivibrator circuit 56 is operative in response to input signals less than a predetermined value to provide output pulses representative of the input signal level. For course error signals of magnitude above the predetermined value, circuit 56 is operative to provide a DC level as a gating signal for gates 46 and 48. Pulse signals are provided for course error signals which are relatively small, typically less than ± 2° error. A control 58 is provided for circuit 56 to adjust the output pulses thereof to produce intended rudder movement in response to a corresponding error signal. This control 58 in effect adjusts the pulse output in accordance with the dynamics of the particular rudder to be steered. For larger error signals, typically greater than ± 2°, a continuous, rather than a pulsed control signal is produced for rudder drive.

The output signal from amplifier 36 is applied to respective inputs of comparators 60 and 62. These comparators receive respective reference signals $V_{ref\ 3}$ and $V_{ref\ 4}$ from reference sources 64 and 66. The output signal from comparators 60 and 62 are applied to respective inputs of AND gates 50 and 52. The gates 50 and 52 provide respective right rudder and left rudder control signals to rudder drive apparatus 68 to cause movement of the rudder in the desired direction and by the desired amount. The reference sources 64 and 66 are adjustable to provide a rudder limit control. One of the reference sources 64 and 66 provides a relatively positive reference level with respect to the zero reference position, while the other source provides a relatively negative reference level. A range is thus defined within which rudder control is performed and outside of which rudder control is inhibited. The comparators 60 and 62 provide a first logic level in the presence of input signals within the threshold range which serves as a gating signal for gates 50 and 52 to permit provision of rudder control signals to drive apparatus 68. In the event that a rudder angle signal from amplifier 36 is greater than the corresponding reference level, the associated one of comparators 60 and 62 provides an opposite logic level which inhibits the associated AND gate. As a result, rudder control is inhibited for an indicated rudder angle greater than the selected amount.

The digital-to-analog converter 14 provides an analog signal having an intermediate value when no course error is sensed, and having a more positive or a more negative value in response to course errors of corresponding sense. For example, positive analog output signals can denote course errors to the right, while negative output signals represent course errors to the left of desired course. Typically, the output voltage from converter 14 varies between 0 and 5 volts with a level of 2.5 volts being provided in response to a zero error condition. This output voltage typically varies by 0.1 volt for each degree of course error. Similarly, the analog output signal from demodulator 34 representing indicated rudder angle can vary by 0.1 volt for each degree of rudder angle with an intermediate level of 2.5 volts for a zero or neutral rudder position. More positive and more negative voltage levels are provided for respective right and left rudder angles.

The differentiator 16 provides a signal representing the rate of change of course error and which is subtracted from the error signal from converter 14. As the course error approaches zero, the derivative of the error also approaches zero, and, therefore, differentiator 16 is effective to dampen the error signal and minimize overshoot. The integrator 28 is operative to average the error signal from converter 14 and in effect provides a system bias level about which the course error varies.

Figure 2:
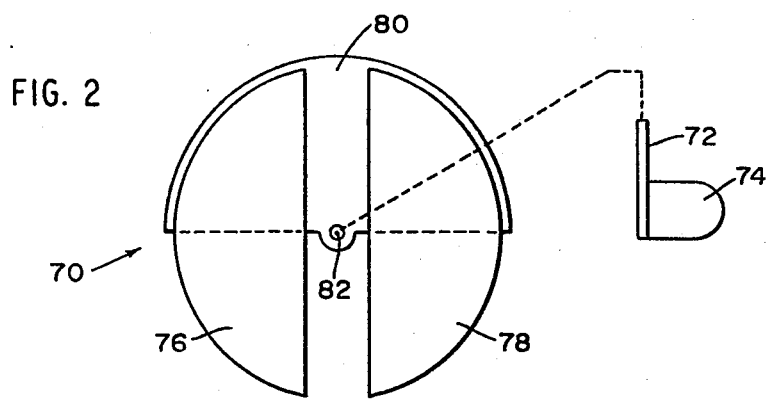
FIG. 2 is a schematic representation of a capacitive rudder angle sensor useful in the invention.
Figure 3:
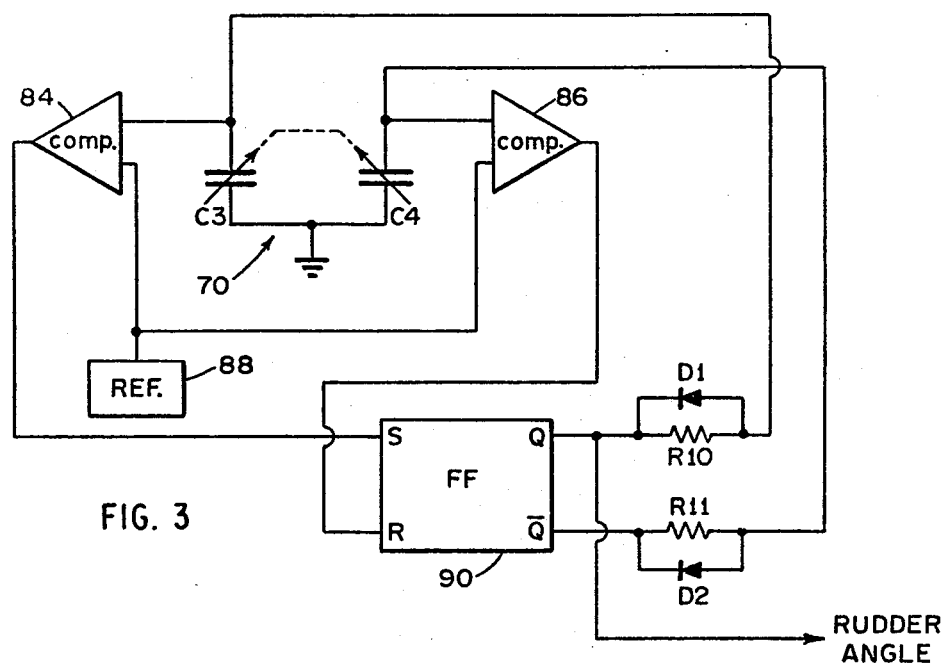
FIG. 3 is a schematic representation of the capacitive rudder angle sensing circuitry of the invention.

The rudder angle indicator is shown more particularly in FIGS. 2 and 3. As seen in FIG. 2, a capacitive sensor 70 is coupled to a shaft 72 of a rudder 74. The sensor 70 includes first and second generally semicircular capacitor plates 76 and 78 disposed in a common plane and having a third capacitor plate 80, also of generally semicircular configuration, disposed in spaced relationship with respect to plates 76 and 78 and relatively movable with respect to plates 76 and 78 about a shaft 82. The capacitor structure serves as a differential capacitor and is itself known in the electronics art. Upon rotation of plate 80 with respect to plates 76 and 78, the capacitance of plates 76 and 80 will vary in a first sense, while the capacitance of plates 78 and 80 will vary in an opposite sense, the total capacitance remaining substantially constant. The capacitive sensor is particularly advantageous for rudder angle indication as there is no physical contact between the movable and non-movable capacitor plates. Typically, plate 80 is linked to rudder shaft 72 for movement in association therewith. Rotation of the rudder causes corresponding rotation of plate 80 relative to plates 76 and 78 to produce a differential capacitance representative of rudder angle.

Referring to FIG. 3, the capacitive sensor 70 is shown schematically, capacitor C3 depicting the capacitor formed by plates 76 and 80, while the capacitor provided by plates 78 and 80 is depicted as capacitor C4. The common plate of the two capacitors is connected to ground, the respective plates of capacitors C3 and C4 being connected to an input of respective comparators 84 and 86. A reference source 88 provides a voltage reference to the second input of each comparator 84 and 86. The output of comparator 84 is coupled to the set input of a flip-flop 90, while the reset input of this flip-flop is coupled to the output of comparator 86. The Q output of flip-flop 90 is coupled via a resistor R10 having a diode D1 in shunt therewith to capacitor C3. The $\overline{Q}$ output of flip-flop 90 is coupled to the capacitor C4 by way of resistor R11 and shunt diode D2. The circuit output is provided by the Q terminal of flip-flop 90.

With the rudder at a zero position, the capacitive sensor provides two equal capacitances, causing an output signal at the Q terminal of flip-flop 90 which is a square wave of zero average amplitude. When the rudder is moved to an angular position other than zero, the capacitance of one of the capacitors C3 and C4 will be correspondingly increased, while the capacitance of the other will be correspondingly decreased, in accordance with the sense of the rudder position to the right or to the left of its zero position. The capacitor having increased capacitance will provide a longer charging time than the capacitor of decreased capacitance such that the comparator 84 or 86 associated with the capacitor of lesser capacitance will be triggered more often to provide switching of flip-flop 90. A pulse width modulated signal is provided by flip-flop 90 which will be of positive average amplitude for rudder angles of one sense and negative average amplitude for rudder angles of opposite sense. This pulse width modulated signal is relatively immune to noise and can be provided on a two wire cable to the demodulator. For example, if the rudder is at an angular position at which capacitor C3 is of increased capacitance and capacitor C4 of corresponding decreased capacitance, the comparator 86 will be rapidly triggered by reason of the faster charging time of capacitor C4. As a result, flip-flop 90 is reset by the more rapid signals from comparator 86, in relation to the signals from comparator 84, such that an output signal is provided of a negative average amplitude representative of the angular position of the rudder.

Figure 4:
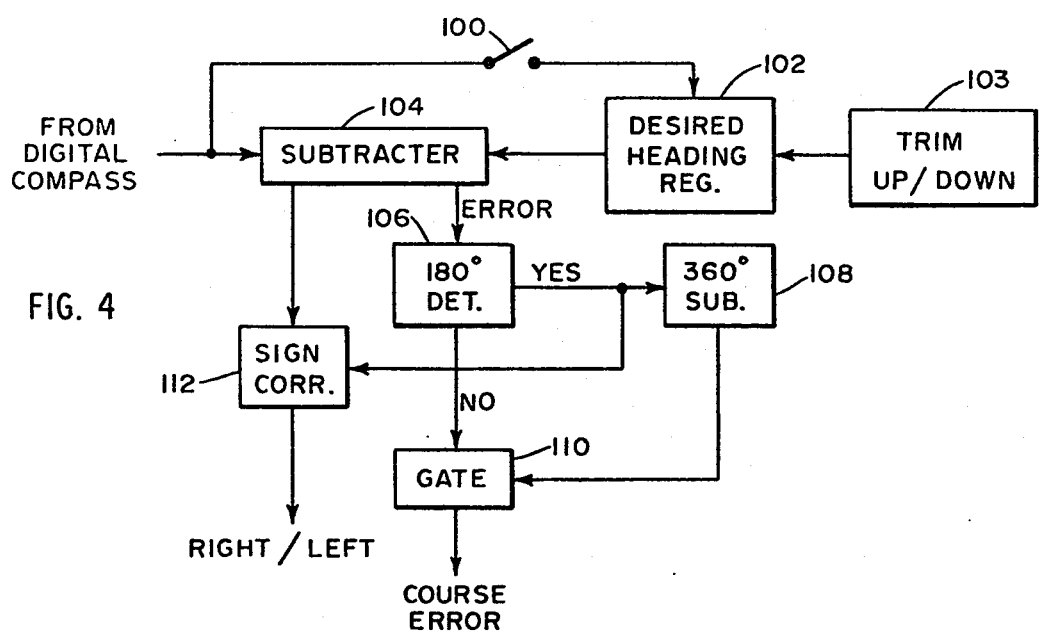
FIG. 4 is a diagrammatic representation of the course error circuitry of FIG. 1.

The course error circuit 12 is shown more particularly in FIG. 4 and is operative to provide digital output signals representative of the magnitude of course error and the sense of error to the right or left of an intended course. This circuit is similar to the compass averaging circuit which is the subject of copending application Ser. No. 552,049 of the same assignee as herein. The digital signal representative of compass heading and provided by digital compass 10 is, upon closure of switch 100, applied to a desired heading register 102 and to one input of a subtraction circuit 104. Circuit 104 also receives an input from register 102 and provides output signals representative of the magnitude and sense of the difference between the digital signals provided by compass 10 and register 102. The register 102 is initially loaded with a representation of the compass heading sensed by digital compass 10. This heading stored by register 102 can be employed as the intended course indication, or the intended course can be altered by trimming the stored heading in register 102 by means of trim control 103. This trim control is operative to increment or decrement the digital count stored in register 102 to provide a representation of intended heading to be maintained.

The digital error signal from subtracter 104 is applied to a detector circuit 106 operative to detect whether the error signal represents a heading difference greater than 180°. If the heading error is greater than 180°, detector 106 provides an output signal to circuit 108 which is operative to subtract a representation of 360° from the heading error to provide an output signal representative of the magnitude of the course error. This output signal from subtracter 108 is provided via gate 110 as an output for application to converter 14. In the event that the course difference is 180° or less, detector 106 provides a direct output indication of the magnitude of the heading error via gate 110. The sense of the course error is provided by sign correction circuit 112. For a course error greater than 180°, the signal from detector 106 applied to circuit 112 causes inversion of the output signal from circuit 112 to denote an opposite sense.

It will be appreciated that the system described herein can be readily implemented in either discrete or integrated circuit form and can be readily installed aboard a vessel without need for a specialized analog course transmitter or servomechanical apparatus. The particular implementation of the invention can vary to suit intended performance requirements. Accordingly, the invention is not to be limited by what has been particularly shown and described except as indicated in the appended claims.

What is claimed is:

1. For use in an automatic piloting system in which rudder control signals are provided to control rudder position, a rudder angle indicator comprising:
   a differential capacitor coupled to said rudder and including a first and a second capacitor respectively providing a first capacitance and a second capacitance;
   said first capacitance increasing and said second capacitance correspondingly decreasing for rudder positions of one sense, said first capacitance decreasing and said second capacitance correspondingly increasing for rudder positions of opposite sense; and
   means operative in response to said first and second capacitances for providing a pulse width modulated signal, the pulse width of which is representative of rudder position.

2. For use in an automatic piloting system in which rudder control signals are provided to control rudder position, a rudder angle indicator comprising:
   a differential capacitor coupled to said rudder and including a first and a second capacitor respectively providing a first capacitance and a second capacitance;
   said first and second capacitances being equal for a zero rudder position, said first capacitance increasing and said second capacitance correspondingly decreasing for rudder positions of one sense, said first capacitance decreasing and said second capacitance correspondingly increasing for rudder positions of opposite sense; and
   means operative in response to said first and second capacitances for providing a pulse width modulated signal, the pulse width of which is representative of rudder position.

3. The rudder angle indicator of claim 2 wherein said differential capacitor includes:
   a first, flat, substantially semi-circular plate;
   second and third flat, substantially semi-circular plates disposed above said first plate and parallel thereto;
   said first capacitor being formed by said first and second plates, and said second capacitor being formed by said first and third plates; and
   means for allowing rotation of said second and third plates with respect to said first plates about an axis perpendicular to said plates.

4. For use in an automatic piloting system in which rudder control signals are provided to control rudder position, a rudder angle indicator comprising:
   a differential capacitor coupled to said rudder and including a first and a second capacitor respectively providing a first capacitance and a second capacitance;
   said first and second capacitances being equal for a zero rudder position, said first capacitance increasing and said second capacitance correspondingly decreasing for rudder positions of one sense, said first capacitance decreasing and said second capacitance correspondingly increasing for rudder positions of opposite sense; and
   means operative in response to said first and second capacitances for providing a pulse width modulated signal of average amplitude representative of rudder position, including:
      means for deriving first and second voltages representative of the charging time of said respective capacitors;
      comparator means operative to provide first and second signals upon exceedance of a threshold level by said first and second voltages; and
      gate means operative in response to said signals to provide a pulse width modulated signal representative of rudder position.

5. The rudder angle indicator of claim 4 wherein said means for deriving includes:

first means for applying said pulse width modulated signal to said first capacitor to provide a charging current during the period when said pulse width modulated signal is in a first state; and second means for applying said pulse width modulated signal to said second capacitor to provide a charging current during the period when said pulse width modulated signal is in a second state.

6. The rudder angle indicator of claim 5 wherein said gate means includes:

flip-flop means having complementary outputs; and means for applying said first and second signals to said flip-flop means and for causing said flip-flop means to be respectively set and reset by said first and second signals; and wherein said first and second means for applying each includes a resistor and diode in parallel connection, said first and second applying means respectively connecting a first output of said flip-flop means to said first capacitor and the complementary output of said flip-flop means to said second capacitor.

* * * * *